United States Patent
Nakajima

(10) Patent No.: US 7,443,429 B2
(45) Date of Patent: Oct. 28, 2008

(54) DISK RECORDING APPARATUS, CALCULATING THE PREDICTED TIME UNTIL RECORDING IS COMPLETED ON A DISK-SHAPED RECORDING MEDIUM

(75) Inventor: Toshihiko Nakajima, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 761 days.

(21) Appl. No.: 10/950,445

(22) Filed: Sep. 28, 2004

(65) Prior Publication Data
US 2005/0078198 A1    Apr. 14, 2005

(30) Foreign Application Priority Data
Oct. 9, 2003  (JP)  ............................. 2003-350908

(51) Int. Cl.
H04N 5/76  (2006.01)
(52) U.S. Cl. ............................... 348/231.99; 348/231.9
(58) Field of Classification Search .................. None
See application file for complete search history.

(56) References Cited

U.S. PATENT DOCUMENTS

| | | | | |
|---|---|---|---|---|
| 6,816,446 | B2 * | 11/2004 | Yoshida et al. | ............ 369/53.24 |
| 6,961,089 | B2 * | 11/2005 | Kubo | .................... 348/333.01 |
| 7,081,924 | B2 * | 7/2006 | Tsuda | ........................ 348/372 |
| 7,177,529 | B2 * | 2/2007 | Yoshida et al. | .............. 386/117 |
| 2002/0191951 | A1 * | 12/2002 | Sodeyama et al. | ............ 386/46 |
| 2003/0058352 | A1 | 3/2003 | Nishijima et al. | ......... 348/231.1 |
| 2004/0201764 | A1 * | 10/2004 | Honda et al. | ........... 348/333.01 |

FOREIGN PATENT DOCUMENTS

| | | |
|---|---|---|
| JP | 2000-236464 | 8/2000 |
| JP | 2001-169150 | 6/2001 |
| JP | 2001-245247 | 9/2001 |
| JP | 2001245247 A * | 9/2001 |
| JP | 2003-101926 | 4/2003 |

\* cited by examiner

*Primary Examiner*—Justin P Misleh
(74) *Attorney, Agent, or Firm*—Fitzpatrick, Cella, Harper & Scinto

(57) ABSTRACT

The invention relates to a disk recording apparatus for recording image data obtained by photographing an object image on a disk, a disk recording method and a program. When completion of photographing, if recording image data onto a disk is not still completed, a notice is made to the effect that image data is being recorded onto the disk.

2 Claims, 4 Drawing Sheets

WAIT FOR A WHILE ...

4 SECONDS LEFT BEFORE COMPLETION

WAIT FOR A WHILE ...

0%                                   100%

DISK RECORDING APPARATUS, CALCULATING THE PREDICTED TIME UNTIL RECORDING IS COMPLETED ON A DISK-SHAPED RECORDING MEDIUM

BACKGROUND OF THE INVENTION

1. Field of the Invention

The present invention relates to a disk recording apparatus, a disk recording method and a program, for recording image data obtained by photographing an object image on a disk.

2. Related Background Art

Video cameras have been used, including a video camera using an 8 mm magnetic tape, a DV (Digital Video) camera and the like. Recently a video camera using an optical disk as a recording medium is available. An image recording/reproducing apparatus using an optical disk has an excellent random access performance and a large storage capacity.

As compared to an apparatus using a contact type recording medium such as a magnetic tape, the disk recording/reproducing apparatus has less head clog and no tape damage, because it records/reproduces optically and in a non-contact manner. The disk recording/reproducing apparatus can be made thinner and lighter and is expected as the next generation video camera.

The disk recording/reproducing apparatus is often equipped with a buffer memory which temporarily stores image data. The apparatus of this type temporarily stores photographed image data in the buffer memory and reads the stored image data from the buffer memory to record it on an optical disk. Therefore, even when data write into the optical disk cannot be continued because of external disturbance such as vibrations and impacts and it becomes necessary to wait for head repositioning or the like, since the image data has been stored in the buffer memory, the photographed image data can be loaded continuously without interception so that a data write failure can be avoided.

Generally the disk recording/reproducing apparatus is equipped with a disk drive apparatus having a disk read/write rate faster than an image data transfer rate. Therefore, photographed image data is once stored in the buffer memory, and when a certain amount of data is stored in the buffer memory, the data can be written in the optical disk at once. In this manner, the number of disk accesses can be reduced, thereby realizing power saving and improving a system efficiency (refer to Japanese Patent Application Laid-Open No. 2000-236464).

Many types of optical disks have been standardized, including CD-R, RW, DVD±R, RW and the like. Each standard provides an area for recording data such as image data and an area for recording management information such as a write start position, a write end position, and title information. This management information is required to be correctly rewritten when data is recorded on the optical disk. When photographing is to be terminated, the management information is rewritten before the power is turned off, to realize a normal operation to be performed at the next photographing or reproduction.

Although a video camera using an optical disk improves the photographing functionality by using a buffer memory, it is associated with the following problems.

Namely, in the video camera system, in such a case that a photographer terminates photographing and turns off the power switch, it is necessary to write data remaining in the buffer memory onto the optical disk and update the management information. Therefore, the system cannot turn off the power until these operations are completed. In addition, since the optical disk apparatus is susceptible to vibrations and impacts provided during the operation, the photographer is required to hold the video camera so as not to impart large impacts until the operation of the optical disk is terminated. The photographer is therefore required to maintain the image recording apparatus for several seconds to several tens seconds until the power is actually turned off after the photographer turns off the power switch. This results in that the photographer feels inconvenience in use and mental anguish.

SUMMARY OF THE INVENTION

The present invention solves the above-described problems and aims to provide a disk recording apparatus, a disk recording method and a program, capable of mitigating inconvenience and mental anguish of a user in the case wherein recording image data on a disk is not completed when photographing is terminated.

As one means for achieving the object of the present invention, a disk recording apparatus of the present invention, for recording image data obtained by photographing an object image on a disk, comprises: a judgment device for judging a state of recording image data onto the disk when the photographing is completed; and a notification device for issuing a notice that image data is being recorded onto the disk, if the judgment device judges that recording image data onto the disk is not still completed.

The above-described object of the present invention will become apparent from the following drawings and the detailed description in conjunction with the drawings.

DETAILED DESCRIPTION OF PREFERRED EMBODIMENTS

Embodiments of the present invention will be described in detail with reference to the accompanying drawings.

Figure 1:
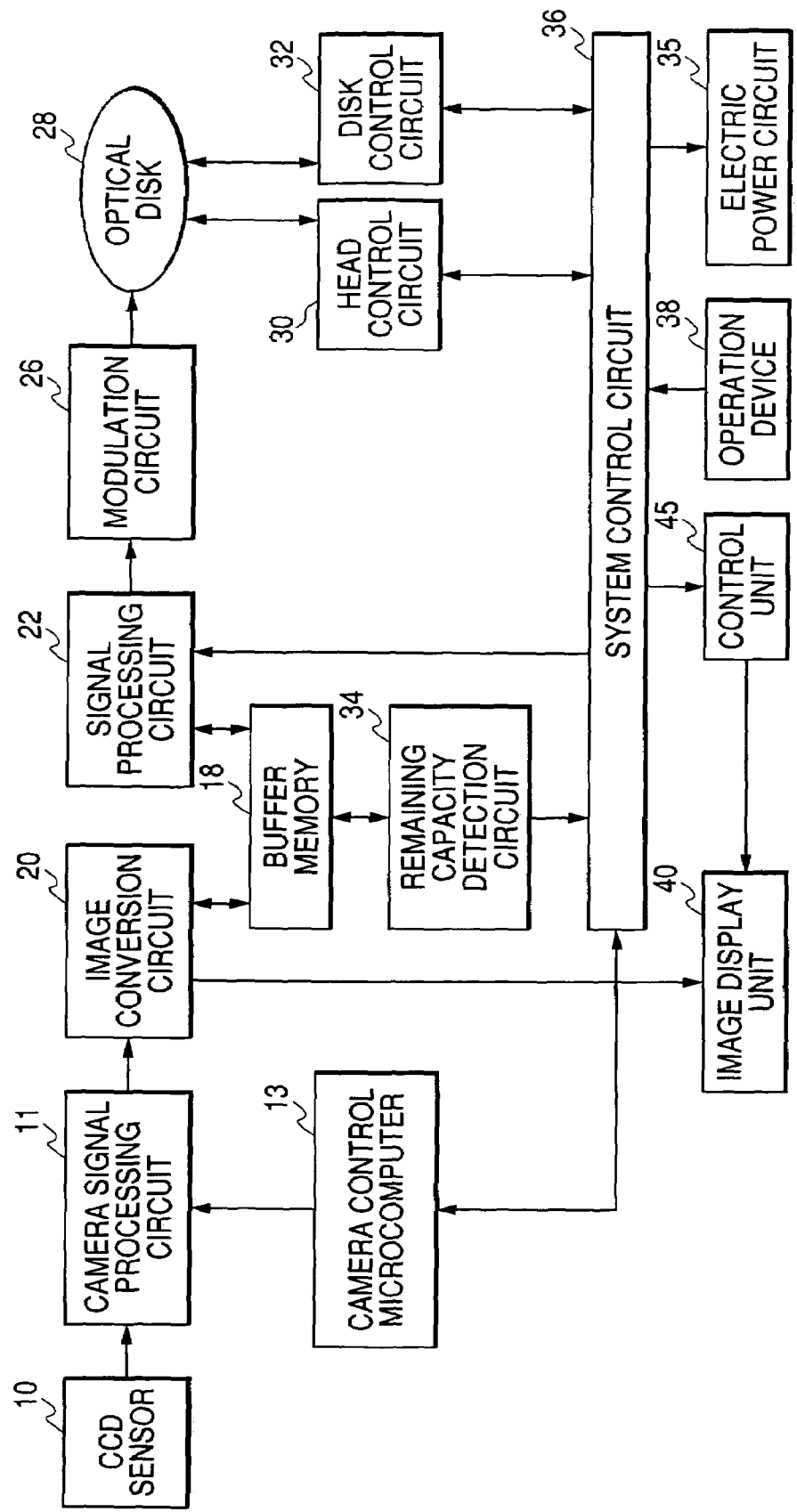
FIG. 1 is a block diagram showing the outline structure of a video camera according to an embodiment of the present invention.

FIG. 1 is a block diagram showing the outline structure of a video camera to which the present invention is applied. A CCD sensor 10 outputs a moving image signal obtained by photographing an object. A camera signal processing circuit 11 processes a signal supplied from the CCD sensor. Reference numeral 13 denotes a camera control microcomputer. In accordance with the state of an optical system, video information obtained from the CCD sensor and information obtained from the operation of the whole camera, the camera control microcomputer 13 controls and optimize the signal processing by the camera signal processing circuit 11.

A buffer memory 18 temporarily stores an output image in the frame unit. An image conversion circuit (so-called MPEG encoding circuit) 20 compression-encodes image data output from the camera signal processing circuit 11 by using interframe correlation information. A signal processing circuit 22 converts compressed image data into format data corresponding to a record format of a disk type recording medium. In this embodiment, although a MPEG encoding circuit is used as the image conversion circuit 20, the invention is not limited thereto, but obviously a circuit for executing other compression encoding such as Motion-JPEG may be adopted.

A modulation circuit 26 modulates image data and records it on a disk 28. A head control circuit 30 controls the position and the like of a recording head of the disk 28. A disk control circuit 32 controls the rotation and the like of the disk 28. A remaining capacity detection circuit 34 detects a remaining capacity of the buffer memory 18. An electric power circuit 35 performs supply/stop of a power. A system control circuit 36 is comprised of a computer and controls the whole video camera. An operation device 38 is used by a user for inputting various instructions to the system control circuit 36. An image display unit 40 displays photographed/reproduced image data, an operation state and the like.

The outline of a recording operation of this embodiment will be described. As a user holds the video camera and instructs to start recording using the operation device 38, an instruction signal corresponding to the instruction operation is input to the system control circuit 36 which in turn makes each component operate in the following manner.

First, the camera signal processing circuit 11 outputs a moving image signal to the image conversion circuit 20. Image data processed by the image conversion circuit 20 is written in the buffer memory 18. The buffer memory 18 can store image memory corresponding in amount to several seconds to several tens minutes. The image conversion circuit 20 compresses the image data written in the buffer memory 18 by the well known MPEG scheme, and writes the compressed image data back into the buffer memory 18. The signal processing circuit 22 reads the compressed image data written back into the buffer memory 18 in a pixel block unit having a predetermined size, and writes the date subjected to an error correction encoding process into the buffer memory 18 in the record format.

When a predetermined amount of image data is stored in the buffer memory 18, the stored image data is sequentially read out into the modulation circuit 26. The modulation circuit 26 modulates the data supplied from the buffer memory 18 into the format suitable for recording onto the disk 28. An head (not shown) records the data output from the modulation circuit 26 on the disk 28.

Generally, a data read rate of the buffer memory 18 is faster than a data write rate. As data is written in the optical disk 28, the amount of data stored in the buffer memory 18 reduces. When the amount of data stored in the buffer memory 18 becomes smaller than a predetermined value, reading data from the buffer memory 18 is terminated and the data processed by the signal processing circuit 20 is stored in the buffer memory 18.

Figure 2:
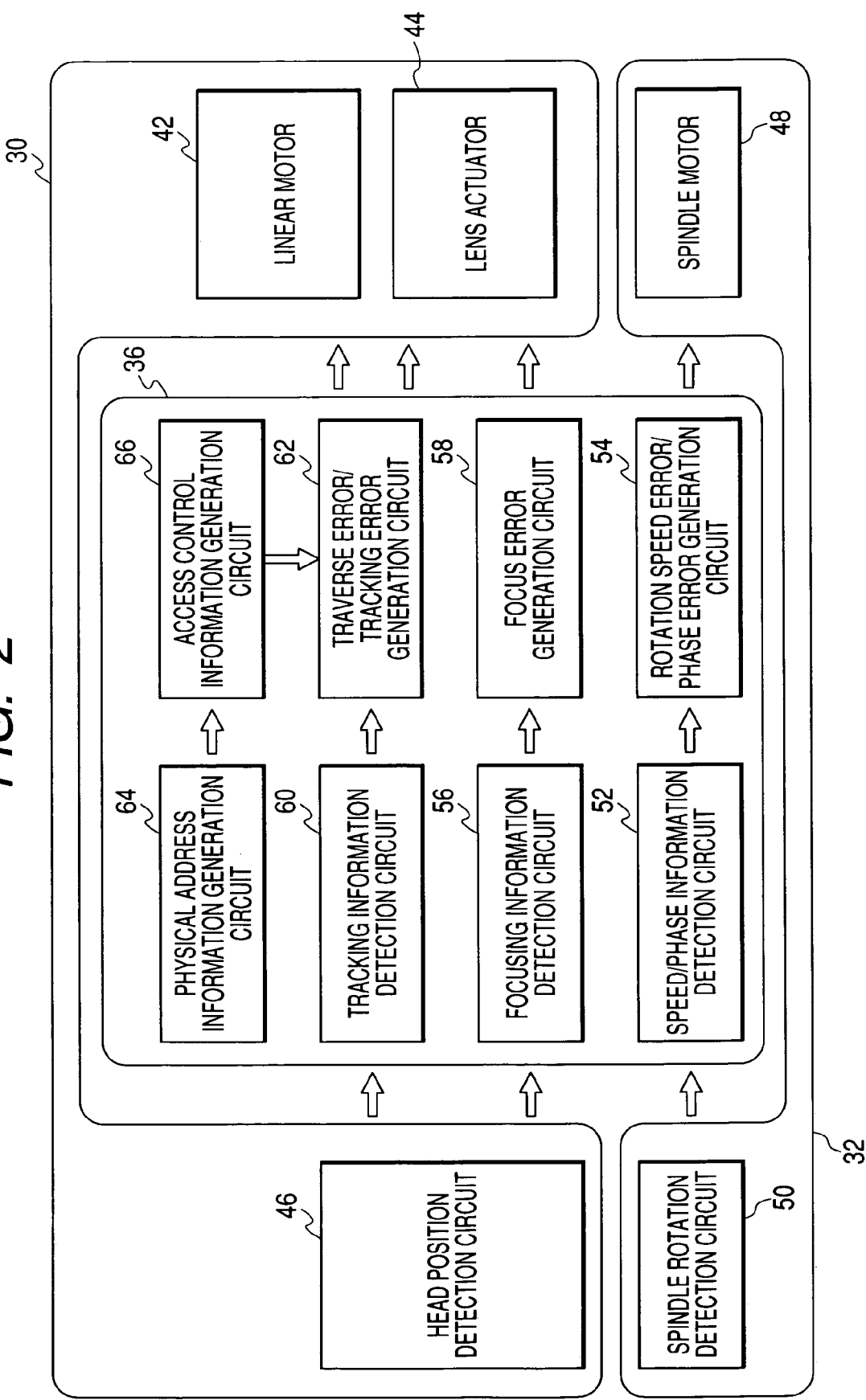
FIG. 2 is a block diagram showing the outline structure of a head control circuit 30 and a disk control circuit 32.

FIG. 2 is a block diagram showing the outline structure of the head control circuit 30 and disk control circuit 32.

The head control circuit 30 includes a linear motor 42 for moving the head along the radius direction of the disk 28, a lens actuator 44 for adjusting a focus and a head position detection circuit 46. The disk control circuit 32 includes a spindle motor 48 for rotating the disk 28 and a spindle rotation detection circuit 50 for detecting the rotation of the spindle motor. The lens actuator 44 is also used to move the head slightly along the radius direction of the disk 28.

The system control circuit 36 includes: a speed/phase information detection circuit 52 for detecting a speed/phase of rotation of the disk 28; a rotation speed error/phase error generation circuit 54 for calculating a difference of the rotation speed/phase from a predetermined value and applying a voltage corresponding to the difference to the spindle motor 48; a focusing information detection circuit 56 for detecting focusing information necessary for retaining a predetermined relative distance between the head and disk 28; a focus error generation circuit 58 for driving the lens actuator 44 in accordance with the focusing information; a tracking information detection circuit 60 for detecting a deviation between the head and a recording track along the disk radius direction; a traverse error/tracking error generation circuit 62 for generating a drive signal to be supplied to the lens actuator 44 and linear motor 42 to make the head be aligned with the recording track, in accordance with the tracking information, wherein the lens actuator finely moves the head along the disk radius direction and the linear motor greatly moves the head; a physical address information generation circuit 64 for generating a write physical address of the disk 28 from a logical address of a file system or the like; and an access control information generation circuit 66 for generating a target value of a traverse error signal from the physical address information.

The speed/phase information detection circuit 52 measures the period of FG pulses output from the spindle rotation detection circuit 50 to detect a rotation speed of the disk 28, and refers to the standard position of the disk 28 to detect a rotation phase. The rotation error/phase error generation circuit 54 generates a rotation control signal of the spindle motor 48 in accordance with a detection result by the speed/phase information detection circuit 52. The spindle motor 48 is driven by a drive signal matching the rotation control signal to thereby rotate the disk 28 at a predetermined rotation speed/phase.

The head position detection circuit 46 detects the position of the head (lens) by using a laser beam passed through the lens of the head and then reflected back by the disk 28. Although specific description is omitted, the head position detection circuit 46 detects a deviation from the recording track position and a relative distance from the disk plane in accordance with the phase of the reflected laser beam and a deformation of a circle of the reflected laser beam. The focusing information detection circuit 56 detects a relative distance between the disk 28 and head in accordance with the information supplied from the head position detection circuit 46. The focus error generation circuit 58 generates a control signal for moving the lens actuator 44 along a direction perpendicular to the plane of the disk 28 in order to optimize the relative distance detected by the focusing information detection circuit 56. The lens actuator 44 is driven by a focus error signal supplied from the focus error generation circuit 58. In this manner, the relative distance between the disk 28 and head can be controlled and optimized.

The tracking information detection circuit 60 detects a deviation between the track and head from an output of the head position detection circuit 46. This deviation information is supplied to the traverse error/tracking error generation circuit 62. The physical address information generation circuit 64 generates a physical address of the disk 28 from the logical address of data to be recorded, and the access control information generation circuit 66 generates information of a radius position of the disk corresponding to the physical address. The traverse error/tracking error generation circuit 62 calculates a deviation between a current head position and a radius position of the disk 28 as the target position, in accordance with the outputs of the circuits 60 and 66. If the deviation is larger than a predetermined value, the traverse error/tracking error generation circuit 62 applies an error signal to the linear motor 42 as a linear motor control signal, whereas if the deviation is smaller than the predetermined value, it applies an error signal to the lens actuator 44 as a radius direction motion signal.

With this operation, data can be recorded on the disk 28 at a predetermined position. A disk type recording medium is fundamentally randomly accessible. A series of data can be recorded at separated positions. However, if the position where the next data is recorded is spaced greatly from the record position immediately before, it is necessary to move the head by using the linear motor 42. As compared to the radius direction motion by the lens actuator 44, it takes a longer time. While the head is moved by the linear motor 42, writing data onto the disk 28 is impossible and the data is maintained stored in the buffer memory 18.

Photographing is often performed by holding the video camera with hands and unexpected vibrations or impacts may be exerted during photographing. If the head position deviates, the video camera enters an out-of-focus state, or the phase control of the disk 28 is released, due to such external vibrations, and data cannot be written in the disk 28 until the head is correctly positioned. Also in this case, the data is maintained stored in the buffer memory 18.

Figure 3:
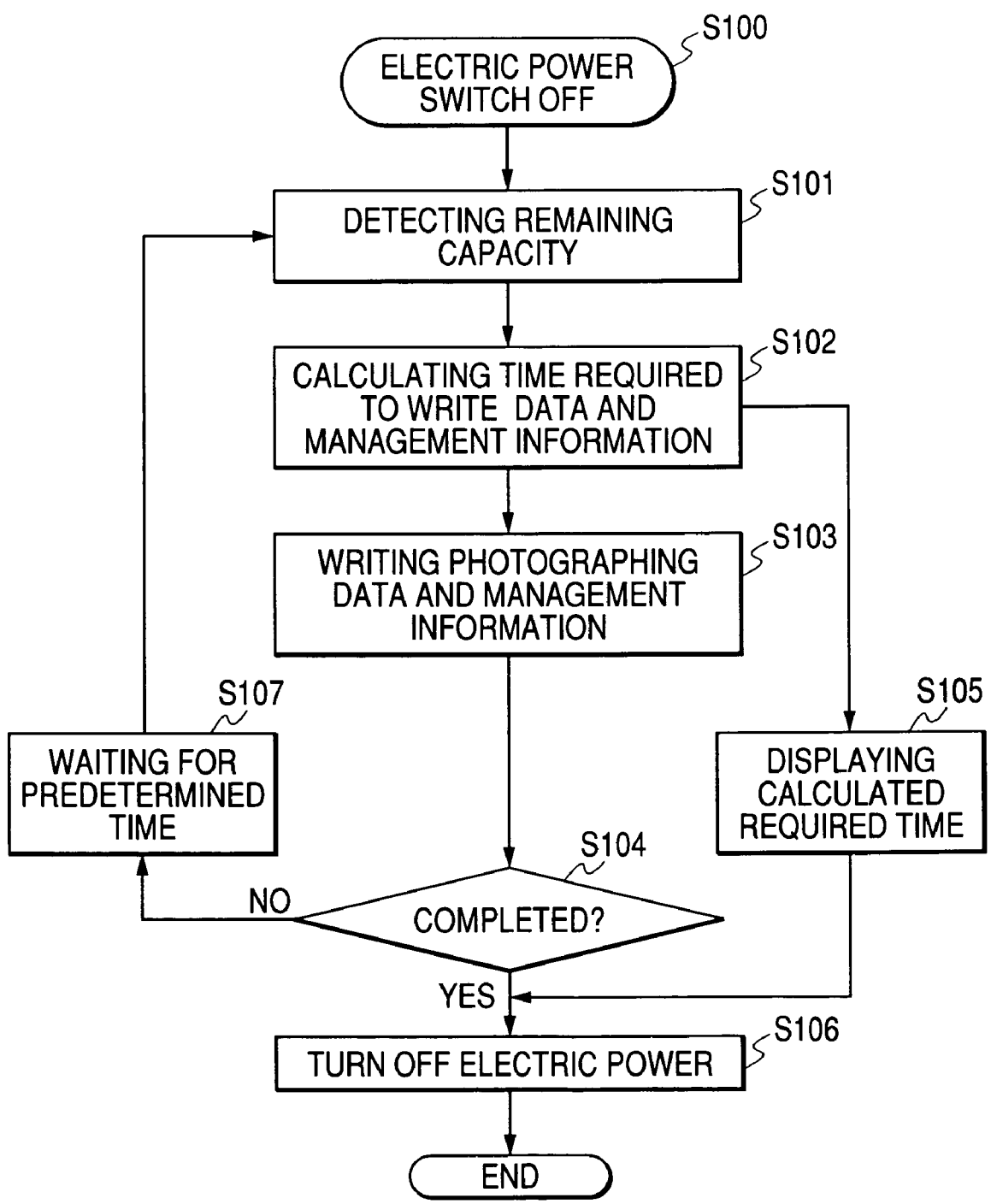
FIG. 3 is a flow chart illustrating the processes to be executed by a system control circuit 36 in the completion operation of the video camera.

The operation characteristic to the embodiment will be described. FIG. 3 is a flow chart illustrating the processes to be executed by the system control circuit 36 when the video camera performs a completion operation in response to the completion of photographing by a user.

After a user completes photographing and instructs a photographing completion to the system control circuit 36 from the operation device 38 (S100), the system control circuit 36 reads a remaining capacity of the buffer memory 18 from the remaining capacity detection circuit 34 (S101). The system control circuit 36 calculates a time required for data recording, in accordance with the remaining capacity of the buffer memory, the data amount of predetermined management information, a data write rate of the disk medium and the data transfer rate determined in accordance with the disk recording apparatus (S102).

Figures 4, 5:
FIG. 4 is a diagram showing a first display example of a time required for data record.
FIG. 5 is a diagram showing a second display example of a time required for data record.

The system control circuit 36 displays the time calculated at Step S102 on the image display unit such as shown in FIG. 4, via the image control unit 45, as shown in FIG. 1, and as shown in step S105 in FIG. 4. In the display example shown in FIG. 4, although the number of seconds left before actual completion is displayed, it is obvious that the total process time may be shown with a bar graph to display the progress state such as shown in FIG. 5, or both examples may be displayed at the same time. Alternatively, only "WAIT FOR A WHILE" may be displayed to notify the user of the fact that data record is being performed in succession.

Since as described above, the user can confirm the time left before completion on the display screen, it is possible to mitigate the mental anguish that the user cannot know the time when the operation stops and is required to stand by until the video camera is turned off, and to eliminate the inconvenience that the power is still not turned off for some period after the user performed the completion operation.

While the time is displayed at Step S105, the system control circuit 36 writes the image data and management information left in the buffer memory (S103), judges from a record work status detection means (not shown) whether the operation is in a write state (S104). If in the write state, the flow returns to the buffer memory remaining capacity detection Step (S101) after a lapse of a predetermined time (S107), to thereby repeat Step S102 and subsequent Steps. After the necessary data is written on the disk, the system control circuit stops the electric power circuit (S106).

As described above, according to the embodiment, if image data is not still recorded on the disk when a user turns off a power switch, the time left before completion and the like are displayed on the image display unit.

In this manner, after the power switch is turned off, the user can know that disk recording continues and also know the time left before completion or the progress state. The user therefore can operate the video camera comfortably without any inconvenience.

OTHER EMBODIMENTS

In the above embodiment, although the present invention has been described by using an image recording/reproducing apparatus with a built-in camera, the invention is not limited only thereto. For example, it is obvious that the invention is applicable to a combination of a discrete camera unit and a discrete disk recording unit, a camera system constituted of a plurality of units, and the like.

In the above embodiment, although an optical disk is used, it is obvious that the invention is applicable to other disk recording apparatuses such as a hard disk recording apparatus.

A notification method is not limited only to the image display unit, but it is obvious that other notification methods may be applied such as voice notification using a speaker, notification using flashing of a light emitting diode and the like.

The disk record control is not limited only to turn-on and turn-off of the power switch, but the control similar to that shown in FIG. 3 may be executed in response to a depression of a record button even when the power switch is on.

The object of the invention can also be achieved by supplying a recording medium storing software program codes realizing the function of each embodiment described above to a system or an apparatus and making a computer (CPU or MPU) of the system or apparatus read and execute the program codes stored in the recording medium.

In this case, the software program codes themselves realize the novel functions of the invention. Therefore, the recording medium storing program codes and the program codes themselves constitute the present invention.

The storage medium for storing such program codes may be a flexible disk, a hard disk, an optical disk, a magneto optical disk, a CD-ROM, a CD-R, a CD-RW, a DVD-ROM, a DVD-RAM, a DVD-RW, a DVD-R, a magnetic tape, a non-volatile memory card, a ROM or the like.

The scope of the invention contains the case wherein not only a computer executes the read program codes to realize the embodiment functions but also an OS (operating system) running on a computer performs a portion or the whole of the actual processes in accordance to instructions of the program codes to realize the embodiment functions.

The scope of the invention also contains the case wherein the functions of each embodiment can be realized by writing the program codes read from the storage medium into a memory of a function expansion board inserted into a computer or of a function expansion unit connected to the computer, and thereafter by making a CPU or the like of the function expansion board or function expansion unit execute a portion or the whole of actual processes in accordance with instructions of the program codes.

Although the invention has been described above in connection with the preferred embodiments, the invention is not limited only to the above-described embodiments, but various modifications are possible without departing from the scope described in the attached claims.

This application claims priority from Japanese Patent Application No. 2003-350908 filed Oct. 9, 2003, which is hereby incorporated by reference herein.

What is claimed is:

1. A recording apparatus for recording image data obtained by photographing an object image on a disk-shaped recording medium, comprising:
   a manually operable device configured to instruct completion of a photographing operation of photographing the object image;
   a buffer memory configured to temporarily store the image data obtained by photographing the object image;
   a disk recording circuit configured to read out the stored image data from said buffer memory and record the read-out image data on the disk-shaped recording medium;
   a detection circuit configured to detect the amount of the image data stored in said buffer memory in response to the manually operable device instructing completion of the photographing operation, the detected amount of the image data corresponding to the amount of the image data to be recorded on the disk-shaped recording medium;
   a calculated calculation circuit configured to calculate a prediction time to be taken until recording the image data on the disk-shaped recording medium is completed, on the basis of the image data amount detected by said detection circuit;
   a display circuit configured to display the prediction time calculated by said calculation circuit;
   a determining circuit configured to determine whether said disk recording circuit has finished reading out the stored image data from the buffer memory and recording the read-out image data on the disk-shaped recording medium after the instructing of completion of the photographing operation by the manually operable device;
   a control circuit configured to control said detection circuit and said calculation circuit so as to repeat their operations after waiting a predetermined period of time if said determining circuit determines that said disk recording circuit has not completed reading out the stored image data from the buffer memory and recording the read-out image data on the disk-shaped recording medium after the instructing of completion of the photographing operation by the manually operable device; and
   an electric power circuit configured to turn off in response to the determining circuit determining that said disk recording circuit has finished reading out the stored image data from the buffer memory and recording the read-out image data on the disk-shaped recording medium.

2. A recording apparatus according to claim 1, further comprising:
   an instruction circuit configured to instruct the turning off of electrical power of said recording apparatus,
   wherein said control circuit controls said detection circuit and said calculation circuit so as to operate in accordance with said instruction circuit instructing the turning off of the electrical power of said recording apparatus and said control circuit turns off the electrical power of said recording apparatus in accordance with the recording of image data on the disk-shaped recording medium being completed.

* * * * *